United States Patent
Gallo (12)

(10) Patent No.: US 7,328,488 B1
(45) Date of Patent: Feb. 12, 2008

(54) HOSE CLAMP CLIP

(76) Inventor: Thomas S. Gallo, 2417 Tanglewood Dr., Sarasota, FL (US) 34239

(*) Notice: Subject to any disclaimer, the term of this patent is extended or adjusted under 35 U.S.C. 154(b) by 95 days.

(21) Appl. No.: 11/289,212

(22) Filed: Nov. 29, 2005

(51) Int. Cl.
*F16L 33/00* (2006.01)
*F16L 33/08* (2006.01)

(52) U.S. Cl. .............. 24/20 R; 24/274 R; 24/274 WB

(58) Field of Classification Search ............ 24/19, 24/20 R, 20 TT, 22, 23 R, 169, 176, 182, 24/198, 200, 265 AL, 265 EC, 274 P, 274 R, 24/274 WB, 279, 282, 285, 370
See application file for complete search history.

(56) References Cited

U.S. PATENT DOCUMENTS

| | | | | |
|---|---|---|---|---|
| 59,443 | A | * | 11/1866 | Onions ............... 24/20 EE |
| 91,091 | A | * | 6/1869 | Crookes .................. 24/22 |
| 188,252 | A | * | 3/1877 | Martin ................. 24/23 B |
| 188,742 | A | * | 3/1877 | Lauth .................. 24/23 B |
| 579,899 | A | * | 3/1897 | Scurr .................... 24/198 |
| 1,019,820 | A | * | 3/1912 | Millar ................... 24/198 |
| 2,522,494 | A | | 9/1950 | Baldo |
| 3,950,830 | A | | 4/1976 | Duprez |
| 4,244,088 | A | | 1/1981 | Sauer |
| 4,468,840 | A | | 9/1984 | Sauer et al. |
| 4,686,747 | A | | 8/1987 | Bakdahl |
| 4,956,898 | A | * | 9/1990 | Miyamura et al. ........ 24/274 R |
| 4,972,558 | A | | 11/1990 | Maio et al. |
| 5,309,607 | A | | 5/1994 | Hohmann et al. |
| 5,632,068 | A | * | 5/1997 | Riley et al. ............... 24/326 |
| 5,647,614 | A | | 7/1997 | Asakura |
| 6,205,624 | B1 | | 3/2001 | Mockridge |
| 6,824,169 | B2 | | 11/2004 | Coffman |
| 2004/0207195 | A1 | | 10/2004 | Bowater |
| 2005/0087979 | A1 | | 4/2005 | Coi |

* cited by examiner

*Primary Examiner*—James R. Brittain
*Assistant Examiner*—Ruth C. Rodriguez
(74) *Attorney, Agent, or Firm*—Charles J. Prescott

(57) ABSTRACT

A clip and hose clamp for holding the slotted distal portion of the clamp band against the clamp band to prevent harmful contact with the distal end of the clamp band. The clip includes a main panel having side panels orthogonally extending from side margins of the main panel. The side panels are spaced apart a distance equal to a width of the clamp band to receive the clamp band and prevent relative rotational movement therebetween. A locking tab extends inwardly from opposite corners of each of the side panels and spaced parallel to the main panel, the gap therebetween being slightly greater than twice the thickness of the clamp band. The locking tabs are further configured for the clip to be twist locked onto the clamp band and to receive and hold the end portion against the clamp band.

3 Claims, 5 Drawing Sheets

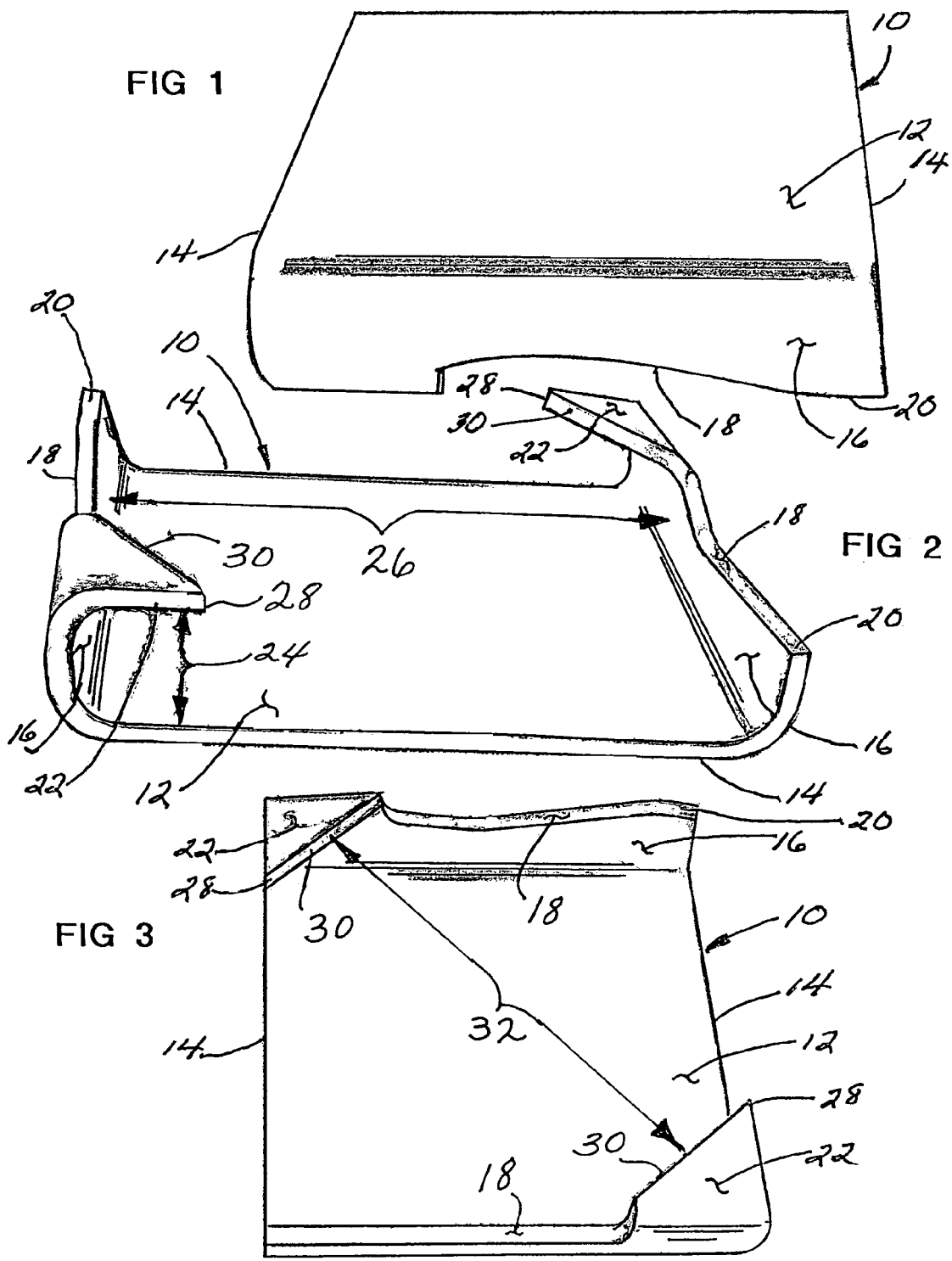

HOSE CLAMP CLIP

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

Figure 4:
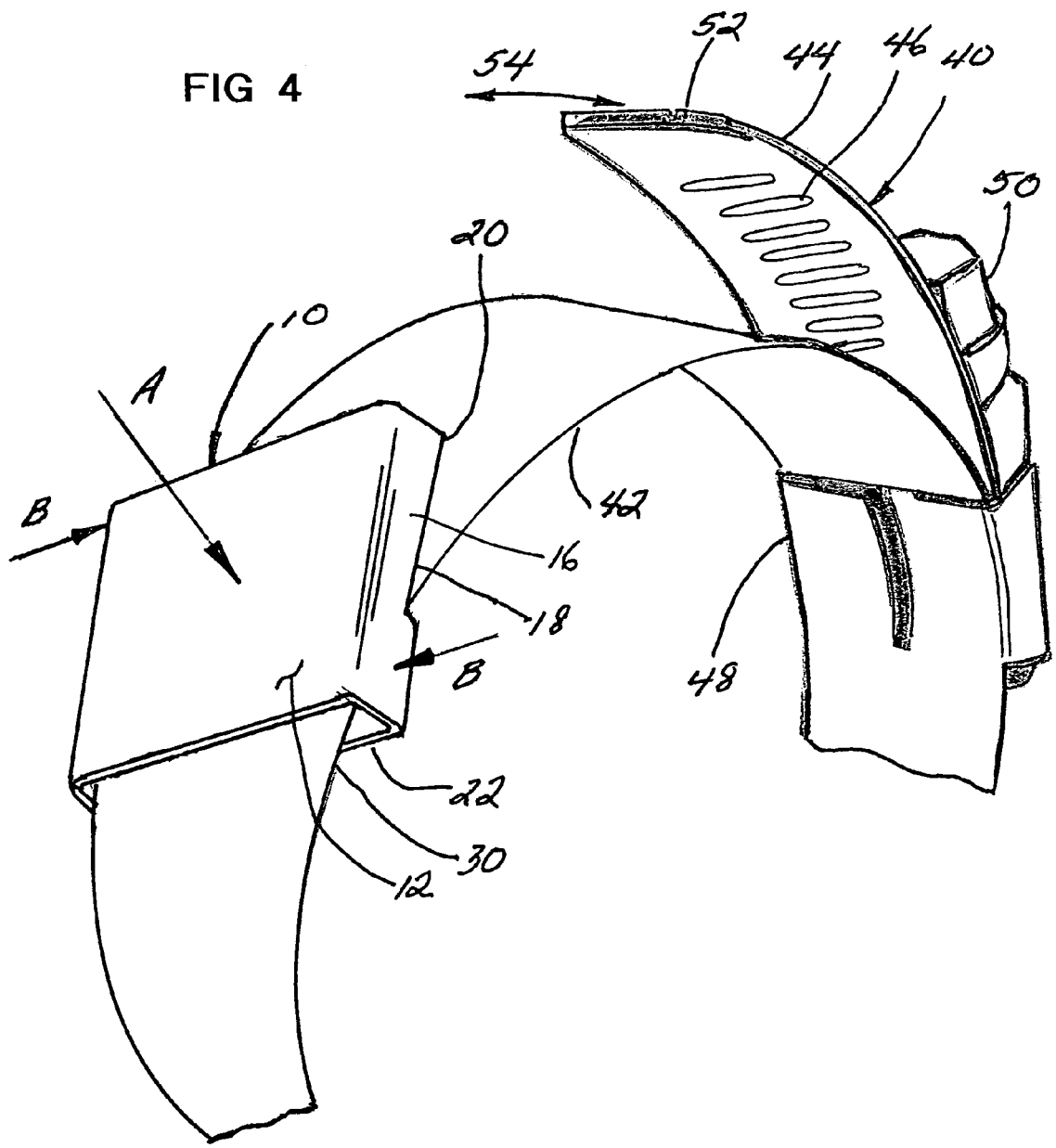

This invention relates generally to hose clamps and more particularly to a clip for holding the relatively stiff distal end of the hose clamp against the main portion of the hose clamp to prevent injury by inadvertent individual contact therewith.

2. Description of Related Art

Hose clamps having a stiff annularly shaped tensioning clamp band formed of substantially stiff flat strip material such as lengths of stainless steel are used in almost every avenue of industry, including the automotive industry, the marine industry and any other industry utilizing a flexible hose requiring sealed attachment thereof onto an internal tubular fitting. These hose clamps include an outer tensioning band, a proximal end of which is connected to a tensioning device for regulating the girth of the clamp band and the other distal end portion of the clamp band having spaced slots which engage with a rotatable screw or worm member within the housing of the tensioning device which produces girth or annular size adjustment and tightening of the clamp band to produce tensioning against the outer surface of the hose over which the hose clamp is secured.

Because of the inherent nature of such clamp bands, the distal end portion carrying the spaced slots must extend beyond the tensioning housing as the girth of the clamp band is reduced and tightened around the end of the hose. Because of the stiff and sharp-edge nature of the material utilized in forming the clamp band, the tendency is for the distal end portion thereof to extend from the housing a distance sufficient, in combination with being outwardly springingly divergent from the annular shape of the main portion of the clamp band to pose a serious risk of harm to individuals when moving in the vicinity of such clamps. Typically, a distal end portion of the clamp band will extend away from the clamp band a distance of ½" to 1" or more depending upon the amount of the distal portion required to be utilized for full tensioning of the clamp band itself around the hose. In such a position spring away from the clamp band itself, the risk of harm is thus incurred.

An early U.S. Pat. No. 2,522,494 to Baldo teaches an improved hose clamp structure with an improved tensioning member, the disclosure showing early signs of the problem of injury or harm to which the present invention is directed. The distal end 11 of the distal portion of the clamp band 10 is there shown beginning to separate from the annular band shape as the tensioning screw 24 reduces the girth of the hose clamp itself.

Maio, et al., in U.S. Pat. No. 4,972,558 discloses a safety hose clamp which includes a guide member for maintaining the forward terminal or distal end of the band in contact with the body or main portion of the clamp band to minimize obstruction and inadvertent contact of the band by an individual. This disclosure clearly depicts the problem at hand and one OEM-manufactured response to this safety problem.

Another approach to resolving the potential harm associated with conventional hose clamps is disclosed by Asakura in U.S. Pat. No. 5,647,614 which teaches the covering of the distal end of the clamp band through the last of the slots or an additional central aperture formed adjacent to the distal end of the clamp band. FIG. 13 therein clearly depicts the emerging distal end of the clamp band and the hazard posed thereby.

Another body of prior art patent teaching is disclosed in the following U.S. patents which address various additional functional issues resolved by the individual teachings contained in these patents:

U.S. Pat. No. 3,950,830 Duprez
U.S. Pat. No. 4,244,088 Sauer
U.S. Pat. No. 4,468,804 Sauer, et al.
U.S. Pat. No. 4,667,375 Enlund
U.S. Pat. No. 4,686,747 Bäkdahl
U.S. Pat. No. 5,309,607 Hohmann, et al.
U.S. Pat. No. 6,205,624 Mockridge
U.S. Pat. No. 6,824,169 Coffman
U.S. Pub. US2004/0207195 Bowater
U.S. Pub. US2005/0087979 Col The present invention clearly addresses this issue of potential harm posed by conventional hose clamps by providing an additional clip which is separately and easily installable onto clamp band either during manufacture or thereafter which simply and easily lockably engages onto the clamp band and will then serve as a retainer or strap for holding the distal band of the clamp band emerging from the tensioning member directly against the annular shaped body of the clamp band in harmless fashion.

BRIEF SUMMARY OF THE INVENTION

This invention is directed to a clip and hose clamp for holding the slotted distal portion of the clamp band against the clamp band to prevent harmful contact with the distal end of the clamp band. The clip includes a main panel having side panels orthogonally extending from side margins of the main panel. The side panels are spaced apart a distance equal to a width of the clamp band to receive the clamp band and prevent relative rotational movement therebetween. A locking tab extends inwardly from opposite corners of each of the side panels and spaced parallel to the main panel, the gap therebetween being slightly greater than twice the thickness of the clamp band. The locking tabs are further configured for the clip to be twist locked onto the clamp band and to receive and hold the end portion against the clamp band.

It is therefore an object of this invention to provide an easily manufacturable and easily installable clip for holding the distal portion of a clamp band of a conventional hose clamp against the main body of the clamp band to eliminate issues of potential harm to an individual.

Yet another object of this invention is to provide an aftermarket clip installable onto virtually all existing hose clamps which will render the stiff outwardly biased distal end portion of the clamp band harmless to individuals by retention thereof directly against the clamp band itself.

Yet another object of this invention is to provide a hose clamp as originally manufactured to include a safety clip for holding the outwardly springy end portion of the clamp band directly against the clamp band itself after being tightened over a hose.

In accordance with these and other objects which will become apparent hereinafter, the instant invention will now be described with reference to the accompanying drawings.

BRIEF DESCRIPTION OF THE SEVERAL VIEWS OF THE DRAWING(S)

Figure 5:
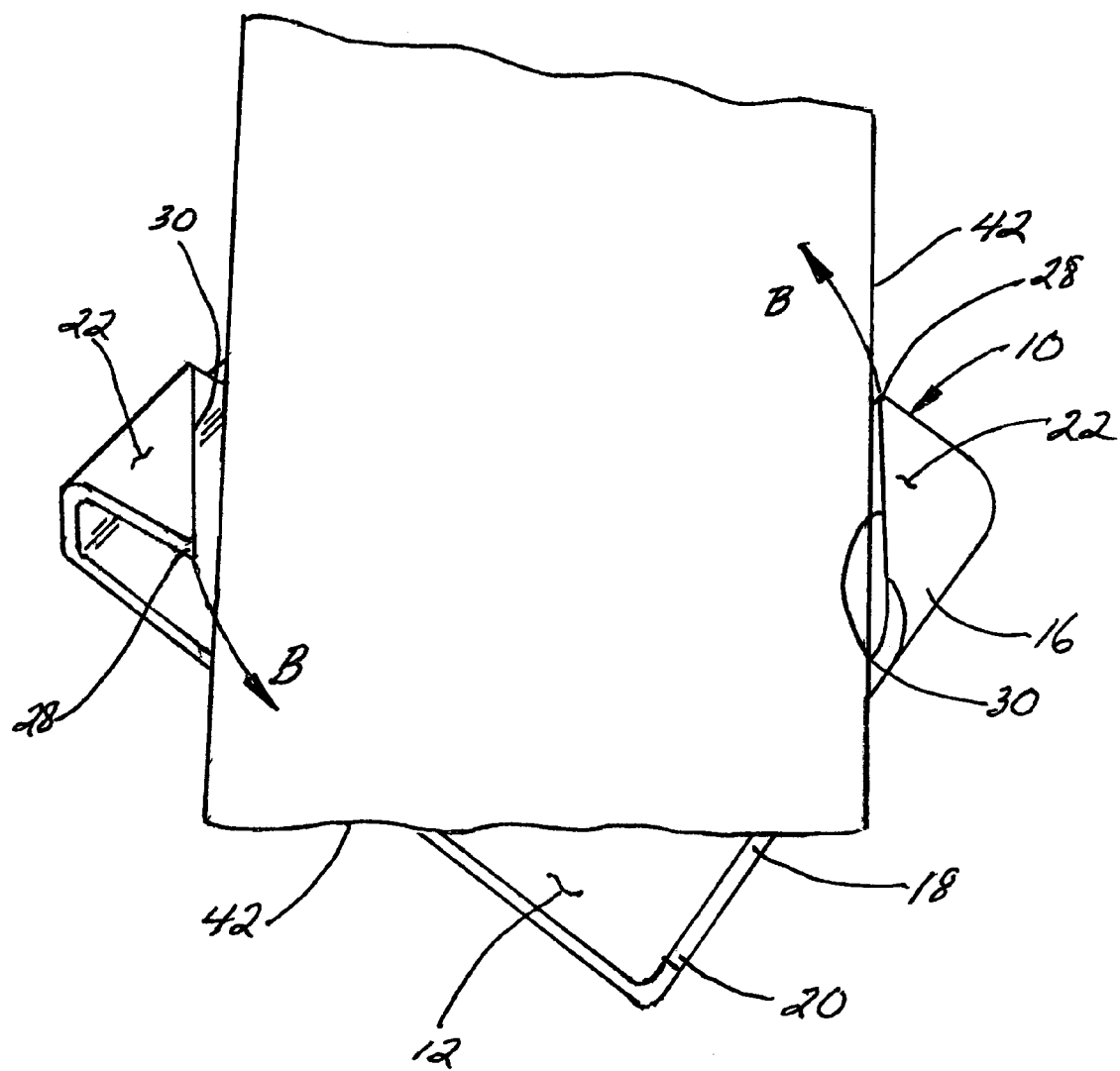
Figure 6:
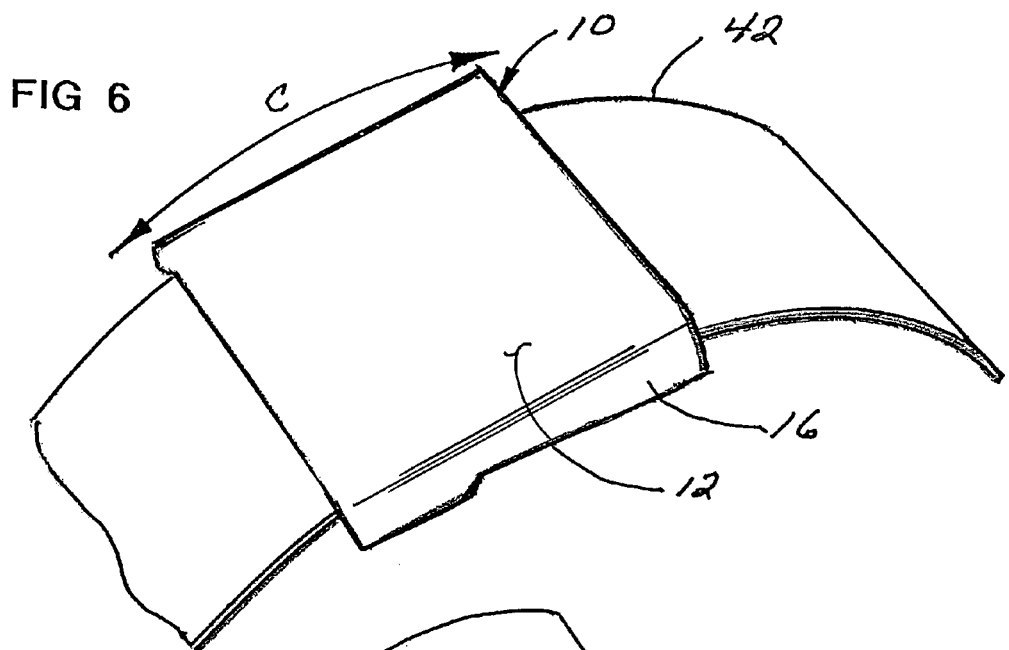
Figure 7:
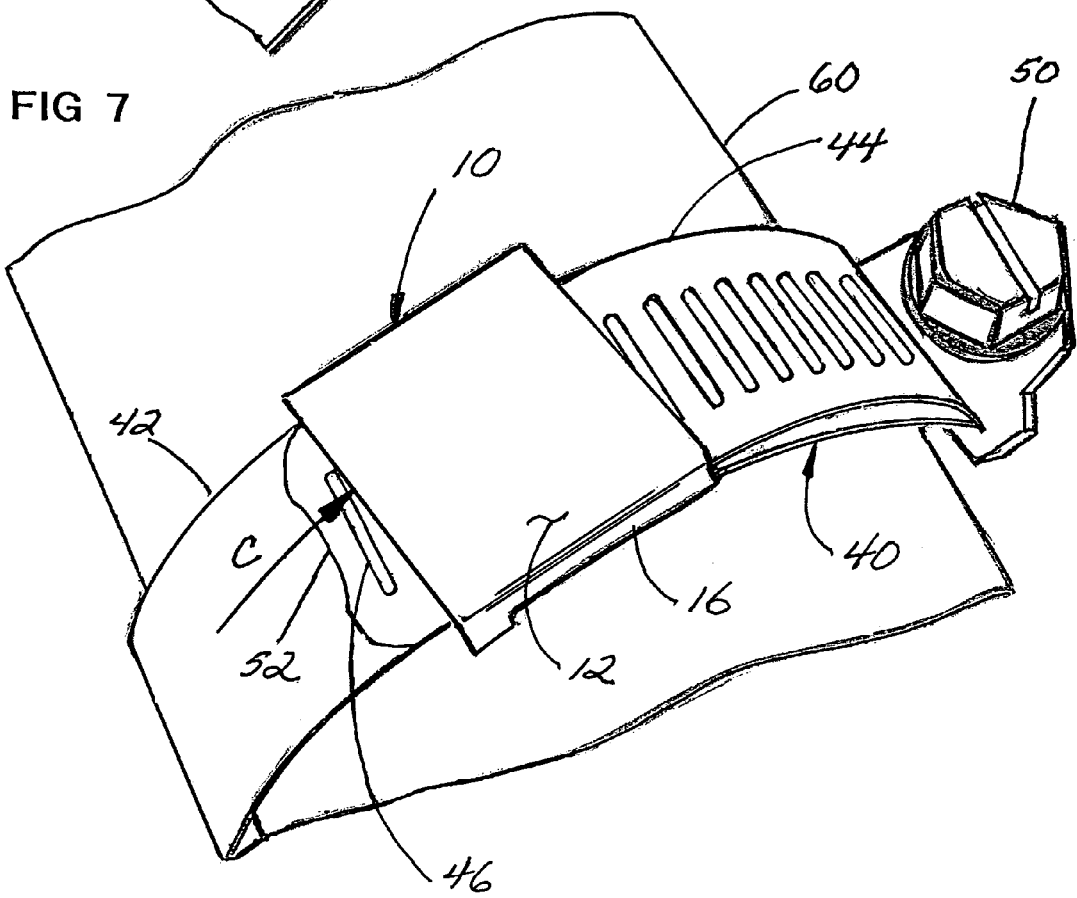
Figure 8:
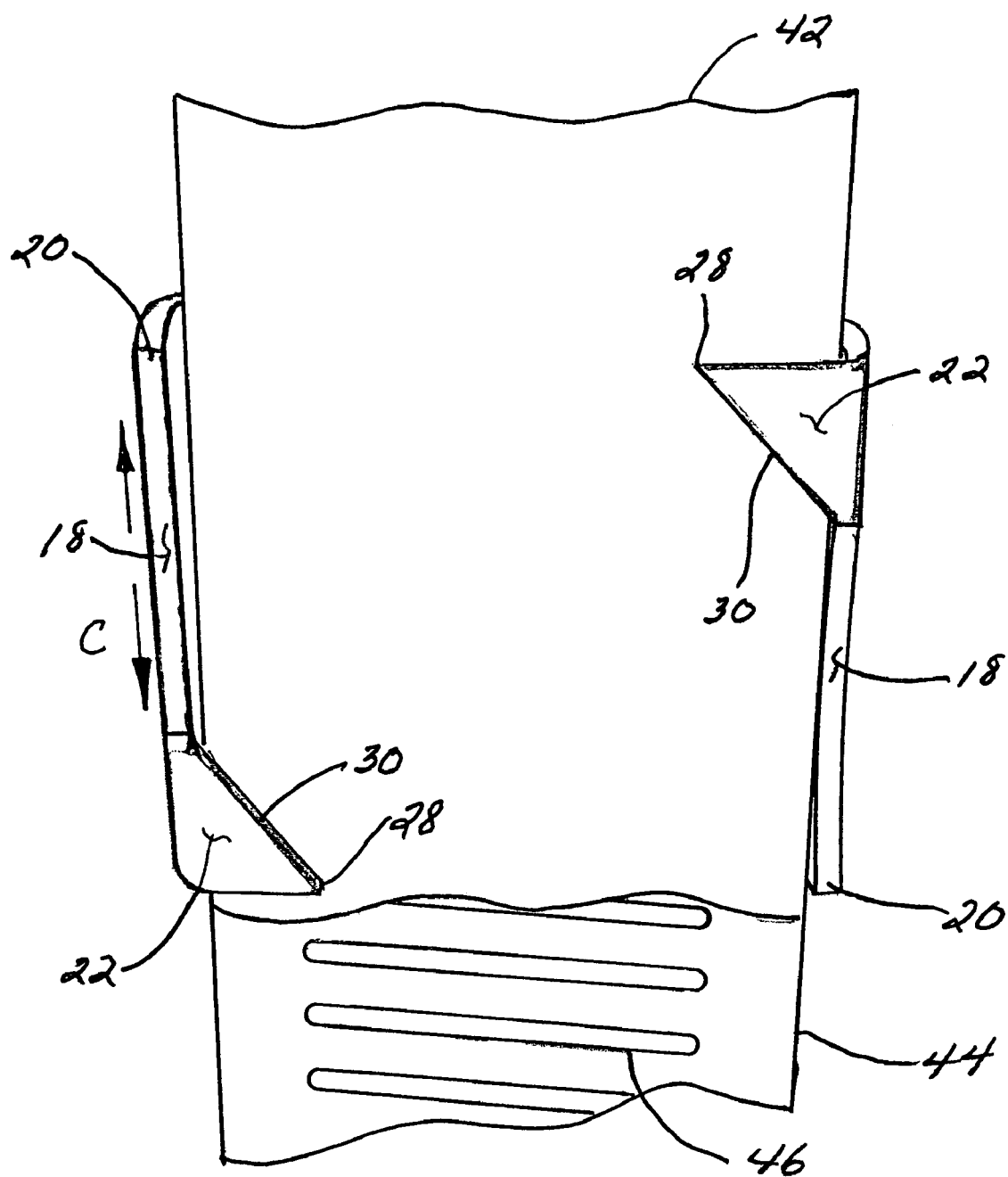

FIG. 1 is an outer side perspective view of the invention.
FIG. 2 is an inner end perspective view of FIG. 1.
FIG. 3 is an inner side perspective view of FIG. 1.
FIG. 4 is a perspective view of the invention of FIG. 1 at the first stage of being installed onto a clamp band of a conventional hose clamp.
FIG. 5 is an inner perspective view of a portion of FIG. 4.
FIG. 6 is an outer perspective view of the clip of the present invention fully installed over the clamp band.
FIG. 7 is a perspective view of the invention in operative position over the clamp band and holding the distal end thereof under tension in harmless position against the main portion of the clamp band after installation.
FIG. 8 is an inner perspective view of the invention as shown in FIG. 7.

DETAILED DESCRIPTION OF THE INVENTION

Referring now to the drawings, and firstly to FIGS. 1 to 3, the clip of the present invention is there shown generally at numeral 10 and is formed of thin spring steel-like material such as stainless steel having a thickness of approximately 0.040", the same thickness typically found in the clamp band of a conventional hose clamp described in more detail herebelow.

The clip 10 includes a preferably generally flat rectangular main panel 12 which may also be perforated or uninterrupted and formed integrally with side panels 16 which are orthogonally oriented and extending in the same direction from the main panel 12. The width between the inner surfaces of the side panels 16 is shown at 26 as is generally equal to or slightly larger than the width of the clamp band 42 shown in FIGS. 4 to 8.

Disposed inwardly from diagonally opposite corners of each side panel 16 is a locking tab 22 which has an inner surface spacing or gap 24 from the inner surface of the main panel 12 a distance generally equal to at least twice the thickness of the clamp band 42 in the range of approximately 0.08" to 0.10". This gap 24 will vary depending upon the thickness of the clamp band 42.

An additional critical aspect of the tabs 22 is with respect to the angularly oriented surfaces 30 oriented at an acute angle to the length of the clip 10 and which are generally parallel and spaced apart a distance 32 which, again, is equal to or slightly greater than the width of the clamp band 42. This dimension 32 is typically in the range of approximately 0.4" to 0.6", but may vary depending upon the particular application of hose clamp requirements.

The edges 18 of the side panels 16 are also critical and are scathed or arcuately cut to reduce the height of the central portion of each of the side panels 16, extending diagonally inwardly between the highest end point 20 and the inner surface of each tab 22 to facilitate twisting installation of the clip 10 onto the clamp band 42 as will be described herebelow. The edges 18 of each side panel 16 extend from the central narrower portion to a height equal to the gap 24 on the locking tabs 22 providing four points, two locking tabs 22 and two high end points 20, to orient the clip 10 along the length of clamp band 42 a shown in FIG. 7.

The economy of the clip 10 is partially derived from the fact that it is made from a single material piece which is easily stamp-formed or roll-formed in large quantity to obtain the configuration described in these FIGS. 1 to 3. The tip 28 of each of the tabs 22 is pointed to again facilitate installation described herebelow.

Referring now to FIGS. 4 to 8, the installation and functioning of the present invention is there described. In FIG. 4, the conventional hose clamp 40 is shown in a partially tightened configuration wherein the distal end portion 44 carrying tooth-engaging slots 46 formed therethrough has been extended by rotation of the threaded fastener 50 within the housing 48 formed or rigidly attached to one of the clamp band 42. Movement of the distal end 52 of the end portion 44 in the direction of 54 is achieved by the rotational movement of the threaded fastener or worm 50 in a conventional well-known manner.

In FIG. 4, the hazardous problem of the distal end 52 and end portion 44 being resiliently positioned away from the clamp band 42 is further depicted. The stiffness of the spring-like material selected to fabricate conventional clamp bands 42, i.e. thin spring-like stainless steel or spring steel, is the cause of this hazard.

The initial step of installing the clip 10 is also shown in FIG. 4 wherein the clip 10 is oriented at an acute angle with respect to the length or longitudinal centerline of the clamp band 42, preferably 45°, so that locking tab edges 30 are generally parallel and positioned just outwardly from the edges of the clamp band 42. A force A is applied against the outer surface of the main panel 12 and as seen in FIG. 5, the opposing parallel surfaces 30 of each of the tabs 22 extend over the side margins of the clamp band 42. Twisting motion in the direction of arrows B in FIGS. 4 and 5, at opposite corners of the side panels 16 in the vicinity of the locking tabs 22 causes the clip 10 to rotate or twist into longitudinal alignment with and over the clamp band 42. The pointed tips 28 of each of the locking tabs 22 assist in resiliently fitting over the opposite surfaces of the clamp band 42 to cause the clip 10 to easily come into alignment lengthwise with the clamp band 42 as seen in FIGS. 6, 7 and 8. When the clip 10 is fully installed over the clamp band 42 only as seen in FIG. 6, the clip 10 is easily slidable back and forth in the direction of arrow C along the length of the clamp band 42. Note that the relief or scalloped area 18 of each of the side panels 16 facilitates this twisting engagement of the clip 10 into the installed position of FIGS. 6, 7 and 8. The high end points 20 snap over the side edge of the clamp 42 to prevent easy or accidental removal of the clip.

Once the clip 10 is installed as seen in FIG. 6, and the hose clamp assembly 40 has been fully tightened over a hose 60 as seen in FIG. 7, the distal portion 44 carrying the spaced slots 46 may then be manually sprung against the main portion of the clamp band 42 after which the clip 10 may be slidably engaged in the direction of arrow C thereover to retain the distal clamp band portion 44 tightly against the clamp band 42 itself alleviating any risk of harm or injury to an individual.

Note that the stiff resiliency of the clamp band 42 exerting an upward outward biased pressure against the inner surface of the main panel 12 serves to hold the clip 10 in the selected position as typically shown in FIG. 7.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A hose clamp clip attachable to a clamp band of a hose clamp comprising:
   a generally flat and rectangular main panel having side panels each formed generally orthogonally to, and extending along side margins of, said main panel;
   two locking tabs each dependently inwardly disposed from opposite corners of said side panels;
   each of said locking tabs spaced from and generally parallel to said main panel, the spacing or gap between each of said tabs and said main panel being slightly greater than twice the thickness of an elongated annular shaped band of a hose clamp;
   said side panels being spaced apart a distance generally equal to, or slightly greater than, a width of the clamp band to receive the clamp band therebetween;
   each of said locking tabs having opposing edge surfaces spaced apart a distance generally equal to, or slightly greater than, the width of the clamp band;
   said clip being slidably engagable over and along both the clamp band and a slotted distal end portion of the clamp band which overlaps and is held against the clamp band by said clip.

2. A clip for a hose clamp, the hose clamp including an elongated hose-encircling clamp band having a series of spaced slots formed through said clamp band extending from a distal end thereof and also having a housing attached to a proximal end of said clamp band and a worm screw held for rotation within said housing in operable engagement with the slots to tighten and loosen the clamp band, said clip, being separable from the hose clamp, comprising:
   a generally flat and rectangular main panel having side panels each formed generally orthogonally to, and extending along side margins of, said main panel;
   each said side panel including a locking tab dependently inwardly disposed from opposite corners of each of said side panels;
   each of said locking tabs spaced from and generally parallel to said main panel, the spacing or gap between each of said tabs and said main panel being slightly greater than twice a thickness of the clamp band;
   said side panels being spaced apart a distance generally equal to, or slightly greater than, a width of the clamp band to receive the clamp band therebetween;
   each of said locking tabs having diagonally opposing generally parallel edge surfaces spaced apart a distance generally equal to, or slightly greater than, the width of the clamp band when oriented at an acute angle with respect to said clip wherein said clip is engagable over and slidable along the clamp band and distal end portion of the clamp band which overlaps and is held against the clamp band by said clip.

3. In combination, a clip and a separate hose clamp comprising:
   said hose clamp including an elongated hose-encircling clamp band having a series of spaced slots formed through said clamp band extending from a distal end thereof and also having a housing attached to a proximal end of said clamp band, a worm screw being held for rotation within said housing in operable engagement with said slots to tighten and loosen the clamp band around an object;
   said clip including a generally flat and rectangular main panel having side panels each formed generally orthogonally to, and extending along side margins of, said main panel;
   each said side panel including a locking tab dependently inwardly disposed from opposite corners of each of said side panels, each of said locking tabs having diagonally opposing generally parallel edge surfaces spaced apart a distance generally equal to, or slightly greater than, the width of said clamp band when oriented at an acute angle relative to said clip;
   said side panels being spaced apart a distance generally equal to, or slightly greater than, a width of said clamp band to receive said clamp band therebetween wherein substantial relative rotational movement between said clip and said clamp band is prevented while said clip is slidable positionable along said clamp band;
   each of said locking tabs spaced from and generally parallel to said main panel, the spacing or gap between each of said tabs and said main panel being slightly greater than twice a thickness of said clamp band wherein, when said clip is twistingly engaged over the clamp band, said clip is slidably movable along said clamp band into engagement over said distal end portion to hold said clamp band and said distal end portion together.

* * * * *